United States Patent
Bergman et al.

(10) Patent No.: US 12,200,714 B2
(45) Date of Patent: Jan. 14, 2025

(54) ONE DOWNLINK CONTROL INFORMATION, DCI, FOR SCHEDULING MULTIPLE TRANSPORT BLOCKS, TBS

(71) Applicant: Telefonaktiebolaget LM Ericsson (publ), Stockholm (SE)

(72) Inventors: Johan Bergman, Stockholm (SE); Anders K Eriksson, Uppsala (SE); Stefan Wänstedt, Luleå (SE); Yutao Sui, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 722 days.

(21) Appl. No.: 17/267,397

(22) PCT Filed: Aug. 7, 2019

(86) PCT No.: PCT/EP2019/071184
§ 371 (c)(1),
(2) Date: Feb. 9, 2021

(87) PCT Pub. No.: WO2020/030677
PCT Pub. Date: Feb. 13, 2020

(65) Prior Publication Data
US 2021/0298058 A1    Sep. 23, 2021

Related U.S. Application Data

(60) Provisional application No. 62/717,384, filed on Aug. 10, 2018.

(51) Int. Cl.
H04W 72/12    (2023.01)
H04L 1/18    (2023.01)
(Continued)

(52) U.S. Cl.
CPC .......... *H04W 72/23* (2023.01); *H04L 1/1812* (2013.01); *H04L 5/0048* (2013.01); *G16Y 10/75* (2020.01)

(58) Field of Classification Search
CPC .... H04W 72/23; H04L 1/1812; H04L 5/0048; G16Y 10/75
See application file for complete search history.

(56) References Cited

U.S. PATENT DOCUMENTS

| | | | |
|---|---|---|---|
| 8,797,957 B2* | 8/2014 | Cheng | H04W 72/044 370/252 |
| 2011/0103324 A1* | 5/2011 | Nam | H04L 5/0048 370/329 |

(Continued)

FOREIGN PATENT DOCUMENTS

| | | |
|---|---|---|
| CN | 103299574 A | 9/2013 |
| CN | 104982084 A | 10/2015 |

(Continued)

OTHER PUBLICATIONS

Chinese Office Action and English Summary dated Jul. 13, 2023 for Application No. 201980066872.9, consisting of 12 pages.

(Continued)

*Primary Examiner* — Bailor C Hsu
(74) *Attorney, Agent, or Firm* — Weisberg I.P. Law, P.A.

(57) ABSTRACT

A method, system and apparatus are disclosed. A network node configured to communicate with a wireless device (WD) is provided. The network node is configured to, and/or includes a radio interface and/or includes processing circuitry configured to transmit a downlink control information (DCI) to the wireless device where the DCI is configured to schedule a plurality of transport blocks (TBs) where the DCI including at least one parameter that is configured to be (Continued)

applied to the plurality of TBs, and perform communications based on the transmitted DCI.

29 Claims, 13 Drawing Sheets

(51) Int. Cl.
  *H04L 1/1812* (2023.01)
  *H04L 5/00* (2006.01)
  *H04W 72/23* (2023.01)
  *G16Y 10/75* (2020.01)

(56) References Cited

U.S. PATENT DOCUMENTS

| | | | | |
|---|---|---|---|---|
| 2012/0182944 | A1* | 7/2012 | Sorrentino | H04L 5/0044 370/329 |
| 2013/0016604 | A1* | 1/2013 | Ko | H04L 1/1861 370/216 |
| 2014/0362812 | A1 | 12/2014 | Ko et al. | |
| 2015/0181576 | A1* | 6/2015 | Papasakellariou | H04L 1/08 370/329 |
| 2016/0100422 | A1* | 4/2016 | Papasakellariou | H04L 1/1822 370/329 |
| 2016/0143017 | A1* | 5/2016 | Yang | H04W 72/23 370/329 |
| 2017/0273025 | A1* | 9/2017 | Su | H04W 52/0261 |
| 2018/0160445 | A1 | 6/2018 | Babaei et al. | |
| 2018/0227156 | A1* | 8/2018 | Papasakellariou | H04L 5/0053 |
| 2019/0246378 | A1* | 8/2019 | Islam | H04L 1/1819 |
| 2019/0386771 | A1* | 12/2019 | Liu | H04B 7/0456 |
| 2020/0059390 | A1* | 2/2020 | Zhang | H04L 1/0007 |
| 2020/0145964 | A1* | 5/2020 | Sengupta | H04L 1/0031 |
| 2020/0146034 | A1* | 5/2020 | Bagheri | H04W 72/1268 |
| 2020/0275474 | A1* | 8/2020 | Chen | H04L 1/1848 |
| 2021/0219329 | A1* | 7/2021 | Zhou | H04L 5/0053 |
| 2022/0029746 | A1* | 1/2022 | Noh | H04B 7/024 |
| 2022/0159677 | A1* | 5/2022 | Hwang | H04W 72/1263 |
| 2022/0159682 | A1* | 5/2022 | Liu | H04W 72/1268 |
| 2022/0248378 | A1* | 8/2022 | Ly | H04L 1/1671 |

FOREIGN PATENT DOCUMENTS

| | | |
|---|---|---|
| WO | 2017196067 A1 | 11/2017 |
| WO | 2018016794 A1 | 1/2018 |
| WO | 2018071104 A1 | 4/2018 |

OTHER PUBLICATIONS

International Search Report and Written Opinion dated Nov. 20, 2019 for International Application No. PCT/EP2019/071184 filed Aug. 7, 2019, consisting of 15-pages.

3GPP TSG RAN WG1 NR Ad-Hoc Meeting R1-1700026; Title: Scheduling scheme for slot aggregation; Agenda Item: 5.1.3.3; Source: Huawei, HiSilicon; Document for: Discussion and decision: Date and Location: Jan. 16-20, 2017, Spokane, USA, consisting of 6-pages.

3GPP TSG RAN WG1 Meeting #85 R1-165116; Title: Control channel design for eLAA; Agenda Item: 6.2.1.1; Source: MediaTek Inc.; Document for: Discussion: Date and Location: May 23-27, 2016, Nanjing China, consisting of 6-pages.

3GPP TSG-RAN WG1 Meeting #94 Tdoc R1-1808036; Title: [draft] Scheduling of multiple DL/UL transport blocks; Agenda Item: 6.2.1.3; Source: Ericsson; Document for: Discussion, Decision: Date and Location: Aug. 20-24, 2018, Gothenburg, Sweden, consisting of 7-pages.

3GPP TSG-RAN WG1 Meeting #94 Tdoc R1-1808045; Title: Scheduling of multiple DL/UL transport blocks in NB-IoT; Agenda Item: 6.2.2.3; Source: Ericsson; Document for: Discussion and Decision: Date and Location: Aug. 20-24, 2018, Gothenburg, Sweden, consisting of 6-pages.

3GPP TSG RAN Meeting #80 RP-181450; Title: New WID on Rel-16 MTC enhancements for LTE; Agenda Item: 10.1.3; Source: Ericsson; Document for: Approval: Date and Location: Jun. 11-14, 2018, La Jolla, USA, consisting of 4-pages.

3GPP TSG RAN #88 R1-1701888; Title: On DCI design for NB-IoT SC-PTM; Agenda Item: 7.2.4.2; Source: Ericsson; Document for: Discussion and Decision: Date and Location: Feb. 13-17, 2017, Athens, Greece, consisting of 4-pages.

3GPP TSG RAN Meeting #80 RP-181451; Title: New WID on Rel-16 enhancements for NB-IoT; Agenda Item: 10.1.3; Source: Ericsson, Huawei; Document for: Approval: Date and Location: Jun. 11-14, 2018, La Jolla, USA, consisting of 4-pages.

3GPP TS 36.321 V13.8.0; 3rd Generation Partnership Project; Technical Specification Group Radio Access Network; Evolved Universal Terrestrial Radio Access (E-UTRA); Medium Access Control (MAC) protocol specification (Release 13), Mar. 2018, consisting of 93-pages.

3GPP TS 36.213 V15.2.0; 3rd Generation Partnership Project; Technical Specification Group Radio Access Network; Evolved Universal Terrestrial Radio Access (E-UTRA); Physical layer procedures (Release 15), Jun. 2018, consisting of 541-pages.

Communication Pursuant to Article 94(3) EPC dated Jul. 24, 2024, issued in corresponding European Patent Application No. 19 755 560.0, consisting of 7 pages.

* cited by examiner

FIG. 4

| Subframe | 0 | 1 | 2 | 3 | 4 | 5 | 6 | 7 | 8 | 9 |
|---|---|---|---|---|---|---|---|---|---|---|
| MPDCCH | | DCI1 | DCI2 | DCI3 | | | | | | |
| PDSCH | | | | TB1 | TB2 | TB3 | | | | |
| Switching | | | | | | G | | | | |
| PUCCH | | | | | | | A1 | A2 | A3 | G |

FIG. 5

| Subframe | 0 | 1 | 2 | 3 | 4 | 5 | 6 | 7 | 8 | 9 | 0 | 1 | 2 | 3 | 4 |
|---|---|---|---|---|---|---|---|---|---|---|---|---|---|---|---|
| MPDCCH | | D1a | D2a | D3a | D4a | D1b | D2b | D3b | D4b | | | | | | |
| PDSCH | | | TB1a | TB2a | TB3a | TB4a | TB1b | TB2b | TB3b | TB4b | | | | | |
| Switching | | | | | | | | | | | G | | | | G |
| PUCCH | | | | | | | | | | | | Aa | | Ab | |

ONE DOWNLINK CONTROL INFORMATION, DCI, FOR SCHEDULING MULTIPLE TRANSPORT BLOCKS, TBS

CROSS-REFERENCE TO RELATED APPLICATIONS

This application is a Submission Under 35 U.S.C. § 371 for U.S. National Stage Patent Application of International Application No.: PCT/EP2019/071184, filed Aug. 7, 2019 entitled "ONE DOWNLINK CONTROL INFORMATION, DCI, FOR SCHEDULING MULTIPLE TRANSPORT BLOCKS, TBS," which claims priority to U.S. Provisional Application No.: 62/717,384, filed Aug. 10, 2018, entitled "ONE DOWNLINK CONTROL INFORMATION (DCI) FOR SCHEDULING MULTIPLE TRANSPORT BLOCKS (TBS)," the entireties of both of which are incorporated herein by reference.

TECHNICAL FIELD

The present disclosure relates to wireless communications, and in particular, to providing downlink control information (DCI) for scheduling multiple transport blocks (TBs) using at least one parameter to be applied to the multiple TBs.

BACKGROUND

In Third Generation Partnership Project (3GPP) Release (Rel) 13, 3GPP developed narrow band (NB)-internet of things (IoT) and long term evolution CatM1 (LTE-M). These radio access technologies provide connectivity to services and applications demanding qualities such as reliable indoor coverage and high capacity in combination with low system complexity and optimized device power consumption.

To support reliable coverage in the most extreme situations, both NB-IoT and LTE-M have the ability to perform link adaptation on all physical channels by means of sub-frame bundling and repetitions. In the downlink this applies to the (N/M) PDCCH (i.e., narrowband/machine type communication (MTC) physical downlink control channel), (N) PDSCH (i.e., narrowband physical downlink shared channel), in the uplink to the (N) PUSCH (i.e., narrowband physical uplink shared channel), (N) PRACH (i.e., narrowband physical random access channel) and PUCCH (i.e., physical uplink control channel) (only for long term evolution-MTC (LTE-M)).

LTE-M is also known as LTE-MTC or enhanced MTC (eMTC) and involves Bandwidth-reduced Low-complexity (BL) wireless devices and wireless devices in Coverage Enhancement (CE), collectively known as BL/CE wireless devices. These wireless devices can operate in Coverage Enhancement Mode A (CE ModeA) which is optimized for no repetitions or moderate numbers of repetitions, or in Coverage Enhancement Mode B (CE ModeB) which is optimized for large numbers of repetitions providing large coverage enhancement.

SUMMARY

In the work item description (WID) of 3GPP Rel-16 MTC enhancements for LTE, one aspect is to enhance DL/UL transmission efficiency and/or wireless device power consumption as follows.

Scheduling Enhancement:
  Specify scheduling multiple DL/UL transport blocks with or without DCI for Single-Cell Point-To-Multipoint (SC-PTM) and unicast [radio access network 1 (RAN1), RAN2]
    Enhancement of semi-persistent scheduling (SPS) to be further discussed.

In the work item description (WID) of 3GPP Rel-16 enhancements for NB-IoT, one aspect is to enhance DL/UL transmission efficiency and/or wireless device power consumption as follows.

Scheduling enhancement:
  Specify scheduling multiple DL/UL transport blocks with or without DCI for single cell point-to-multipoint (SC-PTM) and unicast [RAN1, RAN2]
  Enhancement of SPS to be further discussed.

Some embodiments advantageously provide methods, systems, network nodes and wireless devices for downlink control information (DCI) for scheduling multiple TBs using at least one parameter to be applied to the multiple TBs.

New DCI designs are described in this disclosure, where these DCI designs can be used to schedule multiple TBSs with one DCI, including the HARQ ACK/NACK feedbacks and retransmissions.

According to one aspect of the disclosure, a network node configured to communicate with a wireless device is provided. The network node includes processing circuitry configured to: transmit a downlink control information (DCI) to the wireless device where the DCI is configured to schedule a plurality of transport blocks (TBs) and where the DCI includes at least one parameter that is configured to be applied to the plurality of TBs, and optionally perform communications based on the DCI.

According to one or more embodiments of this aspect, each of the plurality of TBs map to a respective hybrid automatic repeat request (HARQ) process. According to one or more embodiments of this aspect, the processing circuitry is further configured to determine whether to enable DCI that is configured to schedule the plurality of TBs based on an amount of data in a buffer of the network node. According to one or more embodiments of this aspect, the at least one parameter is configured to be applied to hybrid automatic repeat request (HARQ) processes associated with retransmissions.

According to one or more embodiments of this aspect, the plurality of TBs correspond to at least one uplink TB and at least one downlink TB. According to one or more embodiments of this aspect, the processing circuitry is further configured to cause transmission of radio resource control, RRC, signaling to configure the wireless device to receive the DCI in a predefined format where the DCI in the predefined format is specific to the wireless device. According to one or more embodiments of this aspect, the at least one parameter includes at least one of: precoding information, demodulation reference signal, DM-RS, scrambling, downlink assignment index, physical uplink control channel, PUCCH, power control, and a number of physical downlink channel repetitions. According to one or more embodiments of this aspect, the plurality of TBs corresponds to a predefined maximum quantity of TBs that can be scheduled.

According to another aspect of the disclosure, a wireless device configured to communicate with a network node is provided. The wireless device includes processing circuitry configured to: receive a downlink control information (DCI) that is configured to schedule a plurality of transport blocks (TBs) where the DCI includes at least one parameter that is configured to be applied to the plurality of TBs, and optionally perform communications based on the DCI.

According to one or more embodiments of this aspect, each of the plurality of TBs map to a respective hybrid automatic repeat request (HARQ) process. According to one or more embodiments of this aspect, the at least one parameter is configured to be applied to hybrid automatic repeat request (HARQ) processes associated with retransmissions. According to one or more embodiments of this aspect, the plurality of TBs correspond to at least one uplink TB and at least one downlink TB. According to one or more embodiments of this aspect, the processing circuitry is further configured to receive radio resource control, RRC, signaling that configures the wireless device to receive the DCI in a predefined format where the DCI in the predefined format is specific to the wireless device.

According to one or more embodiments of this aspect, the at least one parameter includes at least one of: precoding information, demodulation reference signal, DM-RS, scrambling, downlink assignment index, physical uplink control channel, PUCCH, power control, and a number of physical downlink channel repetitions. According to one or more embodiments of this aspect, the plurality of TBs corresponds to a predefined maximum quantity of TBs that can be scheduled.

According to another aspect of the disclosure, a method for a network node configured to communicate with a wireless device is provided. A downlink control information (DCI) is transmitted to the wireless device where the DCI is configured to schedule a plurality of transport blocks (TBs) and where the DCI includes at least one parameter that is configured to be applied to the plurality of TBs. Communications is optionally performed based on the DCI.

According to one or more embodiments of this aspect, each of the plurality of TBs map to a respective hybrid automatic repeat request (HARQ) process. According to one or more embodiments of this aspect, a determination is performed whether to enable DCI that is configured to schedule the plurality of TBs based on an amount of data in a buffer of the network node. According to one or more embodiments of this aspect, the at least one parameter is configured to be applied to hybrid automatic repeat request (HARQ) processes associated with retransmissions. According to one or more embodiments of this aspect, the plurality of TBs correspond to at least one uplink TB and at least one downlink TB.

According to one or more embodiments of this aspect, transmission is caused of radio resource control, RRC, signaling to configure the wireless device to receive the DCI in a predefined format where the DCI in the predefined format is specific to the wireless device. According to one or more embodiments of this aspect, the at least one parameter includes at least one of: precoding information, demodulation reference signal, DM-RS, scrambling, downlink assignment index, physical uplink control channel, PUCCH, power control, and a number of physical downlink channel repetitions. According to one or more embodiments of this aspect, the plurality of TBs corresponds to a predefined maximum quantity of TBs that can be scheduled.

According to another aspect of the disclosure, a method implemented in a wireless device configured to communicate with a network node is provided. A downlink control information (DCI) that is configured to schedule a plurality of transport blocks (TBs) is received where the DCI including at least one parameter that is configured to be applied to the plurality of TBs. Communications is optionally performed based on the DCI.

According to one or more embodiments of this aspect, each of the plurality of TBs map to a respective hybrid automatic repeat request (HARQ) process. According to one or more embodiments of this aspect, the at least one parameter is configured to be applied to hybrid automatic repeat request (HARQ) processes associated with retransmissions. According to one or more embodiments of this aspect, the plurality of TBs correspond to at least one uplink TB and at least one downlink TB.

According to one or more embodiments of this aspect, receiving radio resource control, RRC, signaling that configures the wireless device to receive the DCI in a predefined format is received. The DCI in the predefined format is specific to the wireless device. According to one or more embodiments of this aspect, the at least one parameter includes at least one of: precoding information, demodulation reference signal, DM-RS, scrambling, downlink assignment index, physical uplink control channel, PUCCH, power control, and a number of physical downlink channel repetitions. According to one or more embodiments of this aspect, the plurality of TBs corresponds to a predefined maximum quantity of TBs that can be scheduled.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a diagram of scheduling pattern for maximum downlink throughput of half-duplex wireless device;

FIG. 5 is a diagram of a scheduling pattern for maximum downlink throughput using 3GPP release 14 HARQ-ACK bundling functionality;

FIG. 6 is a diagram of a scheduling pattern for 4 repetitions on MPDCCH and 4 repetitions on PDSCH;

FIG. 7 is a diagram of scheduling pattern for 4 repetitions on MPDCCH and 4 repetitions on PDSCH;

FIG. 8 is an example of scheduling pattern for multiple downlink transport blocks with single DCI;

FIG. 9 is a scheduling pattern for maximum uplink throughput of half-duplex wireless devices;

DETAILED DESCRIPTION

In third Generation Partnership Project (3GPP) Release 14 (Rel 14) NB-IoT, it was proposed to use one DCI to schedule multiple TBs in the downlink (DL) in SC-PTM, but the proposal was not pursued. A method of supporting acknowledgement (ACK)/negative acknowledgement (NACK) feedback of two narrowband physical downlink shared channel (NPDSCH) HARQ processes is described herein. In this method, one NPUSCH format 2 channel can be used to carrier the feedback of two NPDSCH HARQ processes. A new DCI design using one DCI to schedule two HARQ processes is described.

NB-IoT Aspects

Figure 1:
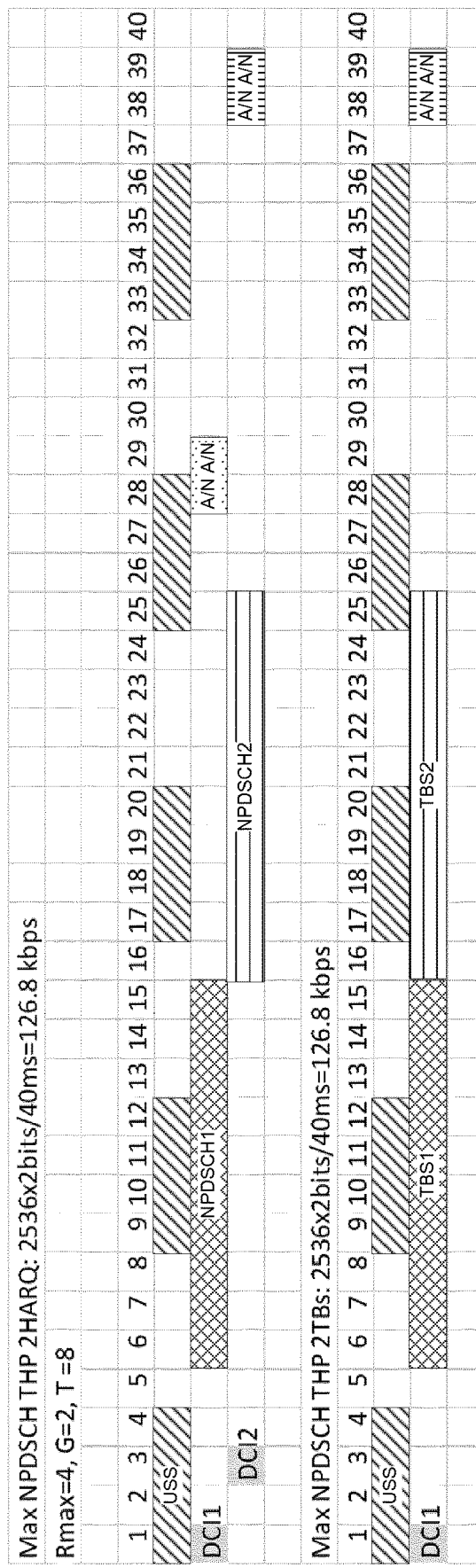
FIG. 1 is a diagram of a downlink peak throughput comparisons.
Figure 2:
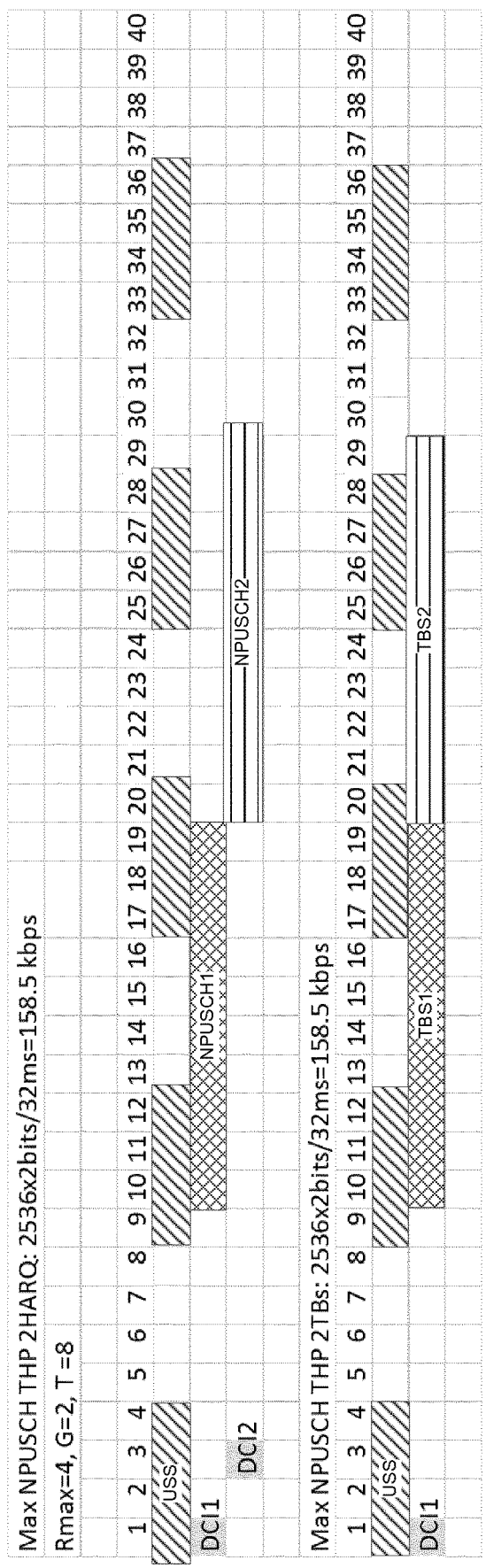
FIG. 2 is a diagram of an uplink peak throughput comparisons.

FIG. 1 and FIG. 2 are diagrams comparing the maximum NPDSCH and NPUSCH throughput for the case when 2 HARQ processes are used with the case that two TBs are scheduled by one DCI. 3GPP Rel-14 scheduling restrictions are considered although other wireless communication standards may also be considered. From FIGS. 1-2, it is shown that when the wireless devices are in good coverage, there may be little to no improvement of the peak throughput if one DCI is used to schedule two TBs. This is because the starting point of the second TB can be reached by DCI2 (i.e., the second DCI) which is in the same search space as DCI1 (i.e., the first DCI).

However, a benefit of using one DCI to schedule two TBs becomes clear if a larger number of repetitions are needed in cases when a large amount of data needs to be communicated. Table 1 and Table 2 show the current scheduling delays for the DL (e.g., from network node to wireless device) and UL (e.g., from wireless device to network node) in NB-IoT, as illustrated below.

TABLE 1

$k_0$ for DCI format N1

| $I_{Delay}$ | $k_0$ | |
|---|---|---|
| | $R_{max} < 128$ | $R_{max} \geq 128$ |
| 0 | 0 | 0 |
| 1 | 4 | 16 |
| 2 | 8 | 32 |
| 3 | 12 | 64 |
| 4 | 16 | 128 |
| 5 | 32 | 256 |
| 6 | 64 | 512 |
| 7 | 128 | 1024 |

TABLE 2

$k_0$ for DCI format N0

| $I_{Delay}$ | $k_0$ |
|---|---|
| 0 | 8 |
| 1 | 16 |
| 2 | 32 |
| 3 | 64 |

For the DL, if the configured Rmax is less than 128, the maximum delay is 128 NB-IoT DL subframe(s). If the configured Rmax is larger than 128, the maximum delay is 1024 NB-IoT DL subframe(s). For the UL, the maximum delay is 64 subframes. Recall that in NB-IoT, the maximum number of repetitions in the DL is 2048, and in the UL is 128. The repetition is done in terms of $N_{SF}$ in the DL, and NRU in the UL.

Figure 3:
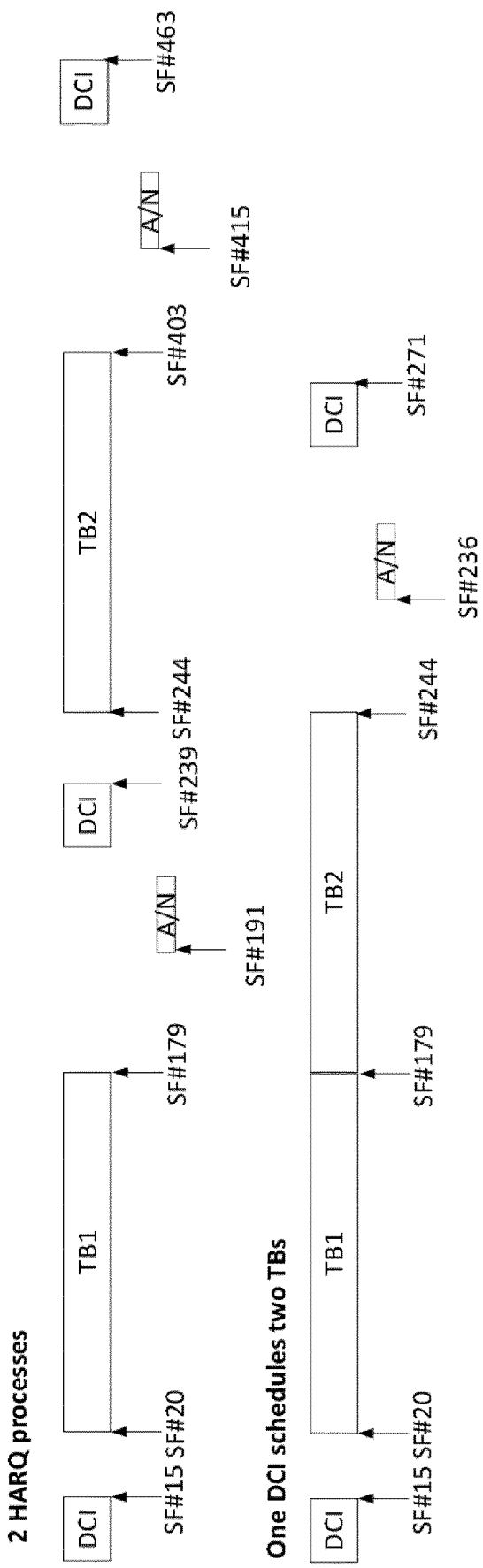
FIG. 3 is an example of downlink scheduling.

To be more specific, using the DL as an example, 2536 bits TB need to be repeated 16 times to reach a wireless device, and Rmax=16 is assumed. In this case, the first TB may require 160 NB-IoT DL subframes to be transmitted. Since the maximum scheduling delay is 128, the scheme depicted in FIG. 1 cannot be used. FIG. 3 illustrates the scheduling comparison of this example. If 2 HARQ processes are used, approximately 11 kbps can be achieved. But if one DCI is used to schedule two TBs, approximately 19 kbps can be achieved, which is a 70% increase in throughput. In the UL, this is more beneficial, as the maximum scheduling delay a DCI can point to, or indicate, is only 64.

For 3GPP Rel-13 functionality, the maximum DL throughput for a half-duplex wireless device is 300 Kbps with the scheduling pattern according to FIG. 4. The 3GPP Rel-14 HARQ-ACK bundling functionality allows for up to 4 TBs ACK/NACK to be bundled, and scheduling pattern for maximum throughput of 530 Kbps is depicted in FIG. 5.

The maximum throughput is obtained by optimizing the use of the different HARQ processes based on the constrained subframes to maximize the number of subframes used for PDSCH transmissions, i.e. the PDSCH duty cycle.

Figures 6, 7:
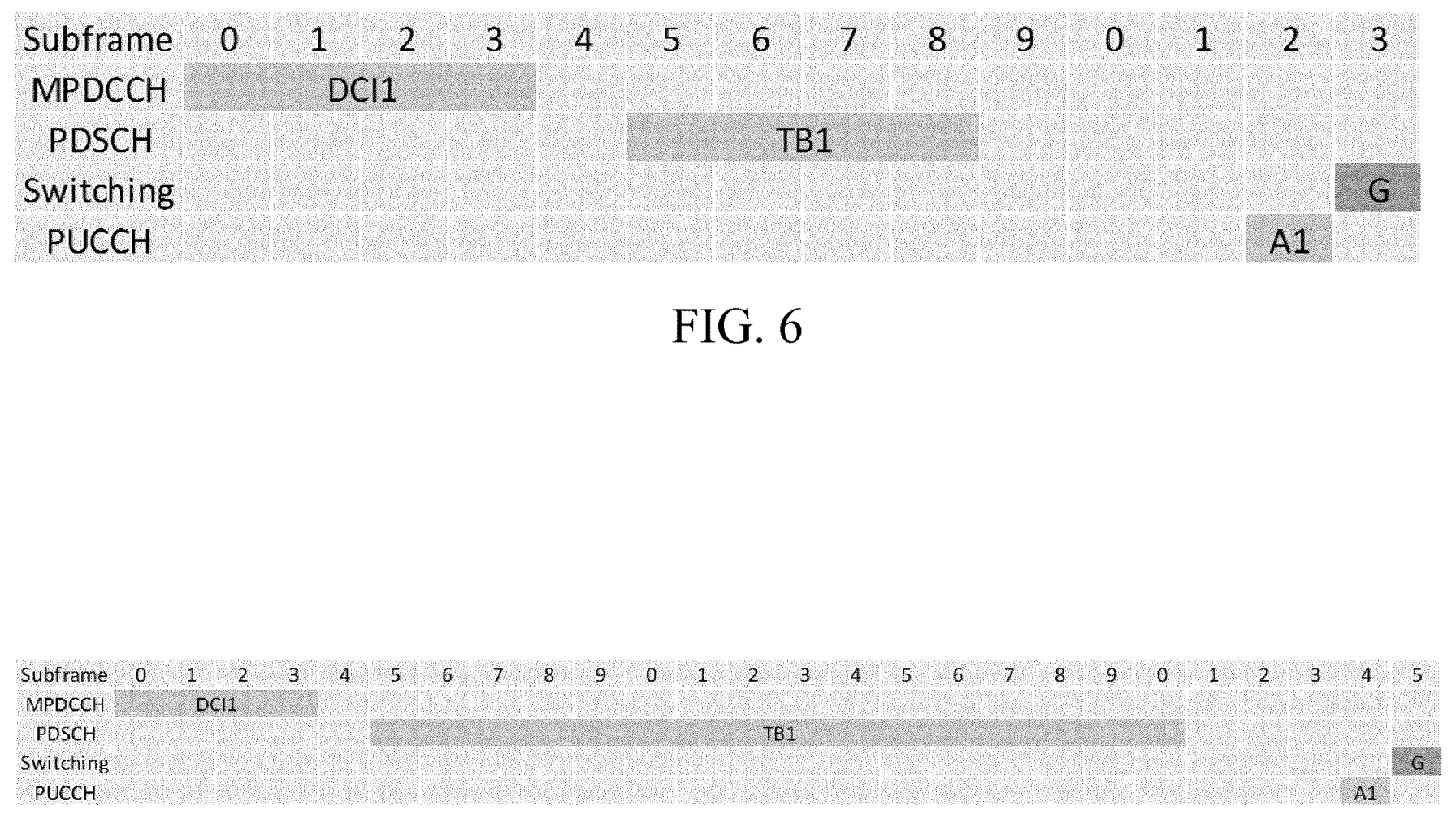

With repetitions on MPDCCH and PDSCH, there are less opportunities to align the HARQ processes. Two scheduling examples are given in FIG. 6 and FIG. 7, with 4 repetitions on MPDCCH and 4 and 16 repetitions on PDSCH, respectively. For these two cases it can be noted that with 4 repetitions on PDSCH a PDSCH duty cycle of 29% is achieved but with 16 repetitions the duty cycle is 62%.

An alternative approach to scheduling one transmission with a large number of repetitions is to segment the data into smaller transport blocks and use fewer repetitions for each transport block but rely on HARQ retransmissions. The performance of this approach suffers from the reduced PDSCH duty cycle, and if the duty cycle can be increased, the throughput in poor coverage is increased.

Figures 8, 9:
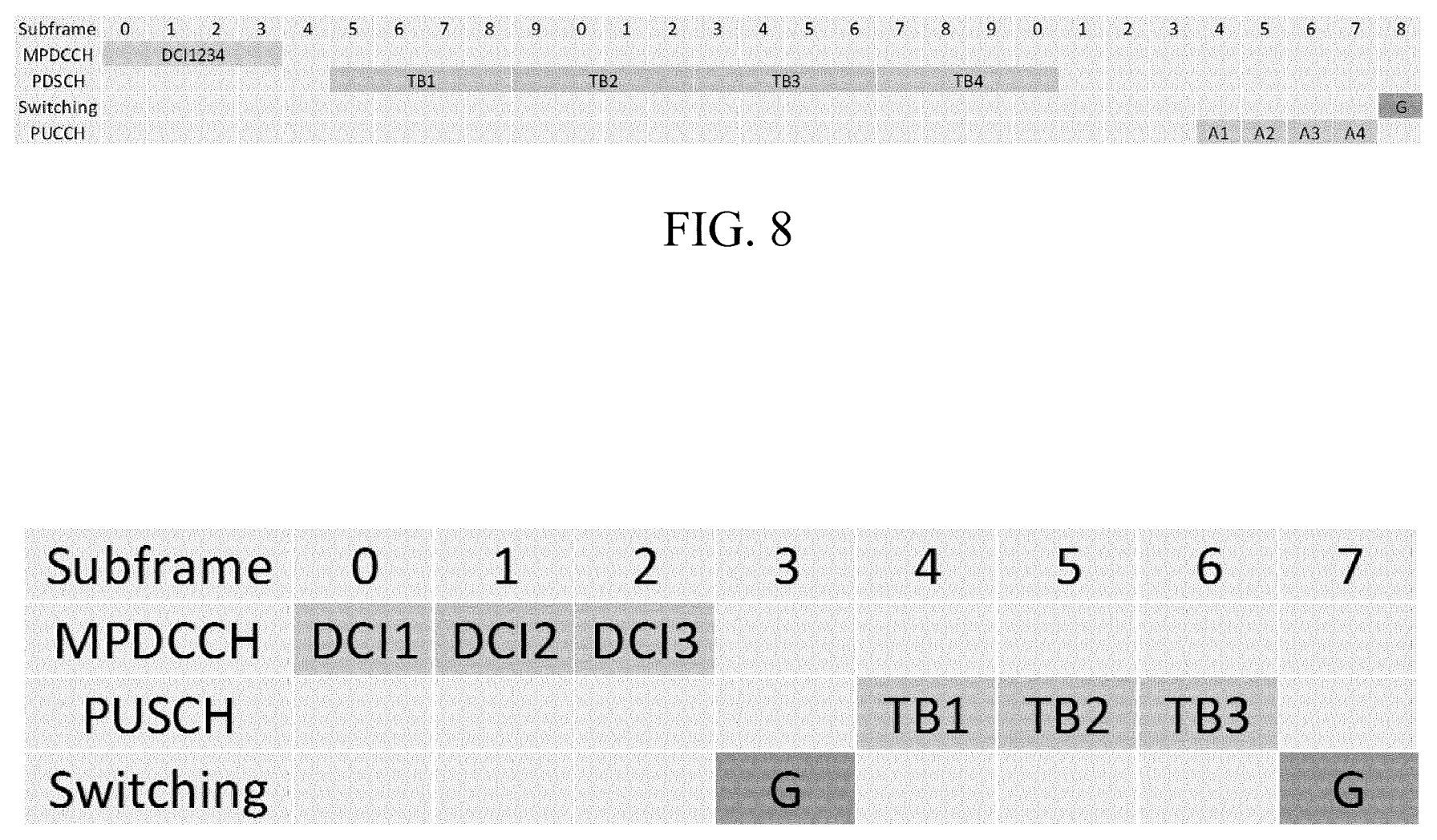

An example of scheduling 4 transport blocks each with 4 repetitions on PDCCH with a single DCI is presented in FIG. 8. For this case, the PDSCH duty cycle is 55%, which potentially may significantly improve the throughput in poor coverage. In this example, the different transport blocks use individual HARQ ACK/NAK, in sequential subframes following the last PDSCH transmissions with the legacy timing, but a scheme of bundling the HARQ ACK/NAK for the different transport blocks may also be considered.

The maximum UL throughput for a half-duplex wireless device is 375 Kbps with a scheduling pattern according to FIG. 9. Similar to the case for the DL, the maximum throughput is obtained by optimizing the use of the different HARQ processes based on the constrained subframes to maximize the number of subframes used for PUSCH transmissions, i.e., the PUSCH duty cycle.

Figure 10:
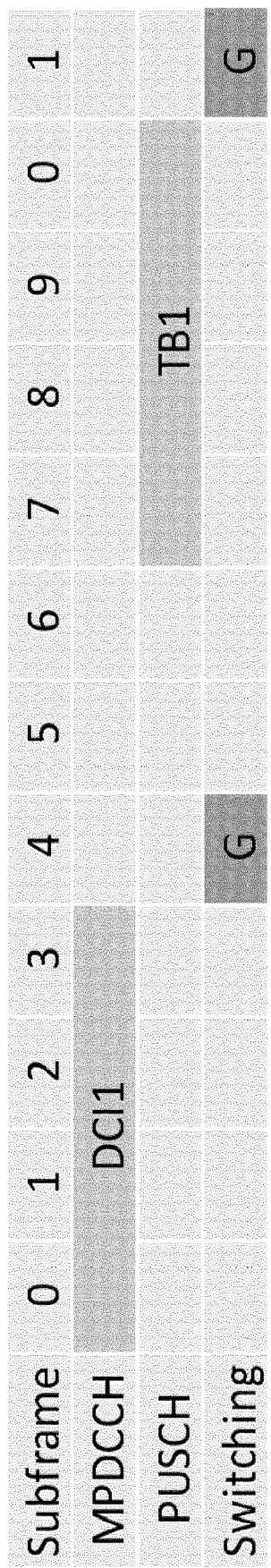
FIG. 10 is a scheduling pattern with 4 repetitions on MPDCCH and 4 repetitions on PUSCH.
Figure 11:
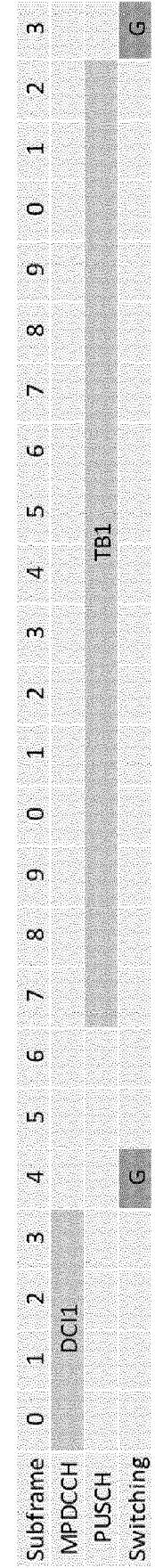
FIG. 11 is a scheduling pattern with 2 repetitions on MPDCCH and 16 repetitions on PUSCH.

With repetitions on MPDCCH and PUSCH, there are less opportunities to align the HARQ processes. Two scheduling examples are given in FIG. 10 and FIG. 11, with 4 repetitions on MPDCCH and 4 and 16 repetitions, respectively, on PUSCH. For these two cases it can be noted that with 4 repetitions on PDSCH a PUSCH duty cycle of 33% is achieved but with 16 repetitions the duty cycle is 67%.

Figure 12:
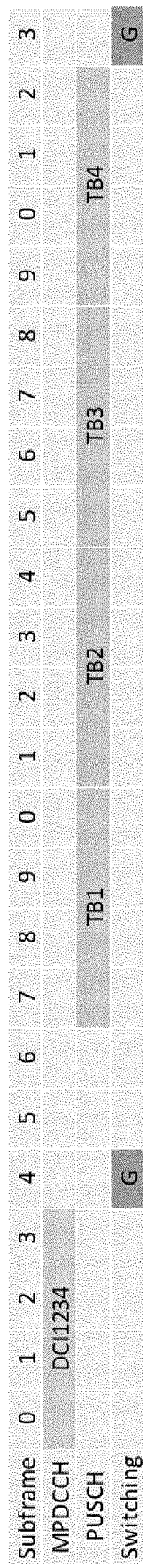
FIG. 12 is a scheduling pattern of multiple uplink transport blocks with single DCI resulting in 66.7% PUSCH duty cycle.

The approach of segmenting data into smaller transport blocks that require less repetitions, and relying on HARQ retransmissions, suffers from a reduced duty cycle with moderate number of repetitions. If multiple PUSCH transport blocks can be scheduled with a single DCI, as outlined in FIG. 12, the throughput may thus be improved in poor coverage.

One of the concerns raised in NB-IoT for using one DCI to schedule multiple TBs is that the DCI decoding reliability is decreased due to the increase of DCI size. Therefore, more repetitions are needed to compensate it. It may be better to keep the DCI size minimum.

In an example, the DCI design of using one DCI to schedule two TBs for NB-IoT was proposed. The design offers good flexibility in terms of DCI fields and what can be scheduled for initial transmission and re-transmission. But this design requires more monitoring efforts from the wireless device, and not all the number of repetitions, and resource allocations can be used. This design may work well for wireless devices in good coverage, but for wireless devices in bad coverage, especially coverages that require more repetitions, the solutions in the design have some limitations and cannot be directly applied.

The methods described advantageously solve at least a portion of the problems with existing systems by allowing efficient scheduling of using one DCI to schedule multiple TBs, as well as HARQ ACK/NACK feedbacks and retransmissions.

Before describing in detail exemplary embodiments, it is noted that the embodiments reside primarily in combinations of apparatus components and processing steps related to providing downlink control information (DCI) for scheduling multiple TBs using at least one parameter to be applied to the multiple TB. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station, gNB or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station, gNB or eNodeB, may be adapted to provide and/or define and/or control one or more cells, e.g., a PCell and/or a LA cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments described herein provide downlink control information (DCI) for scheduling multiple TBs using at least one parameter to be applied to the multiple TBs.

Figure 13:
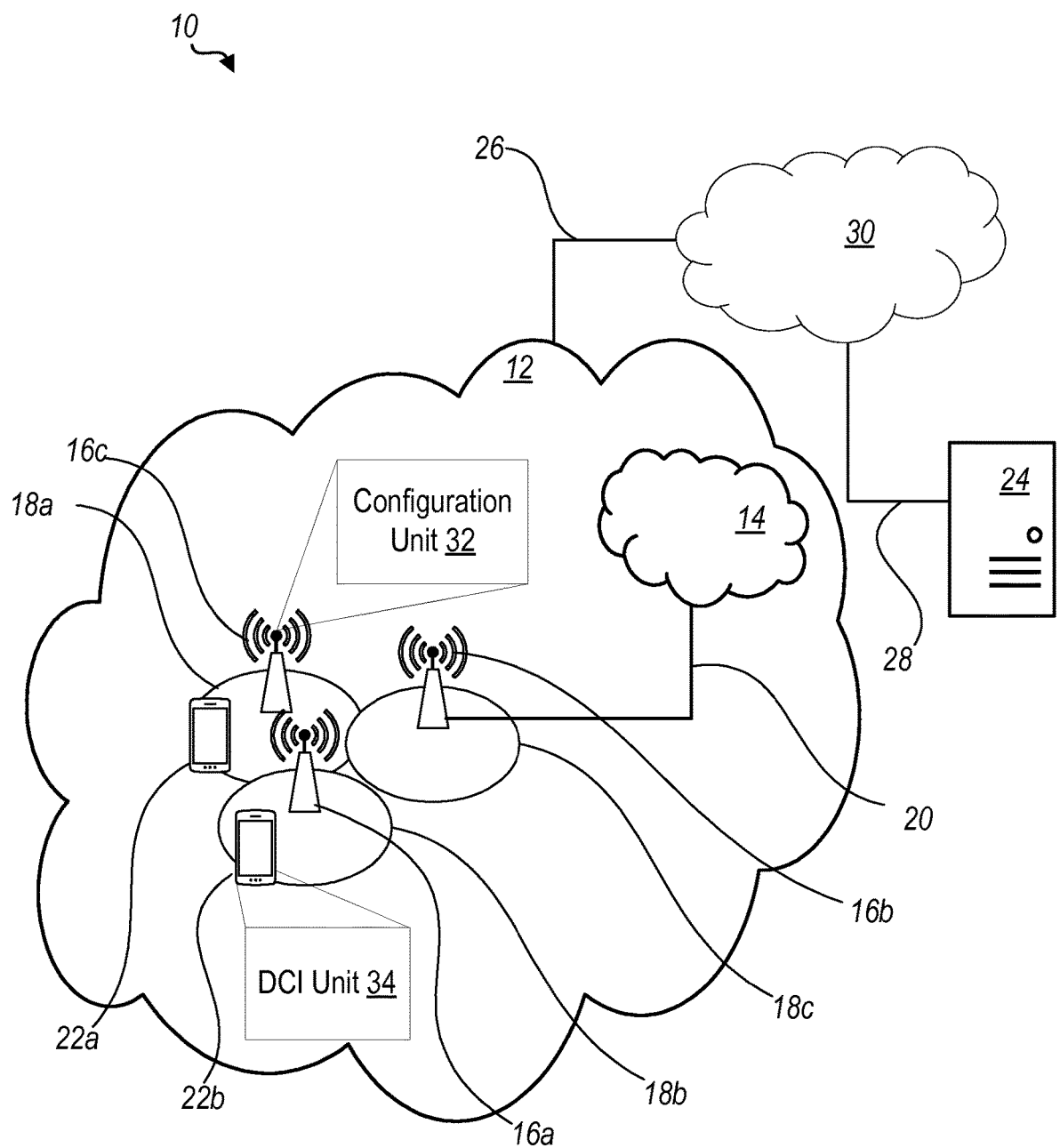
FIG. 13 is a schematic diagram of an exemplary network architecture illustrating a communication system connected via an intermediate network to a host computer according to the principles in the present disclosure.

Returning to the drawing figures, in which like elements are referred to by like reference designators, there is shown in FIG. 13 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 13 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to perform communications based on downlink control information (DCI) for scheduling multiple TBs using at least one parameter to be applied to the multiple TB. A wireless device 22 is configured to include a DCI unit 34 which is configured to perform communications based on downlink control information (DCI) for scheduling multiple TBs using at least one parameter to be applied to the multiple TBs.

Example implementations, in accordance with an embodiment, of the WD 22, network node 16 and host computer 24 discussed in the preceding paragraphs will now be described with reference to FIG. 14. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to provide information related to the DCI described herein.

The communication system 10 further includes a network node 16 provided in a communication system 10 and comprising hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more radio frequency (RF) transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform communications based on DCI for scheduling multiple TBs using at least one parameter to be applied to the multiple TB, as described herein.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a DCI unit 34 configured to perform communications based on DCI for scheduling multiple TBs using at least one parameter to be applied to the multiple TB, as described herein.

Figure 14:
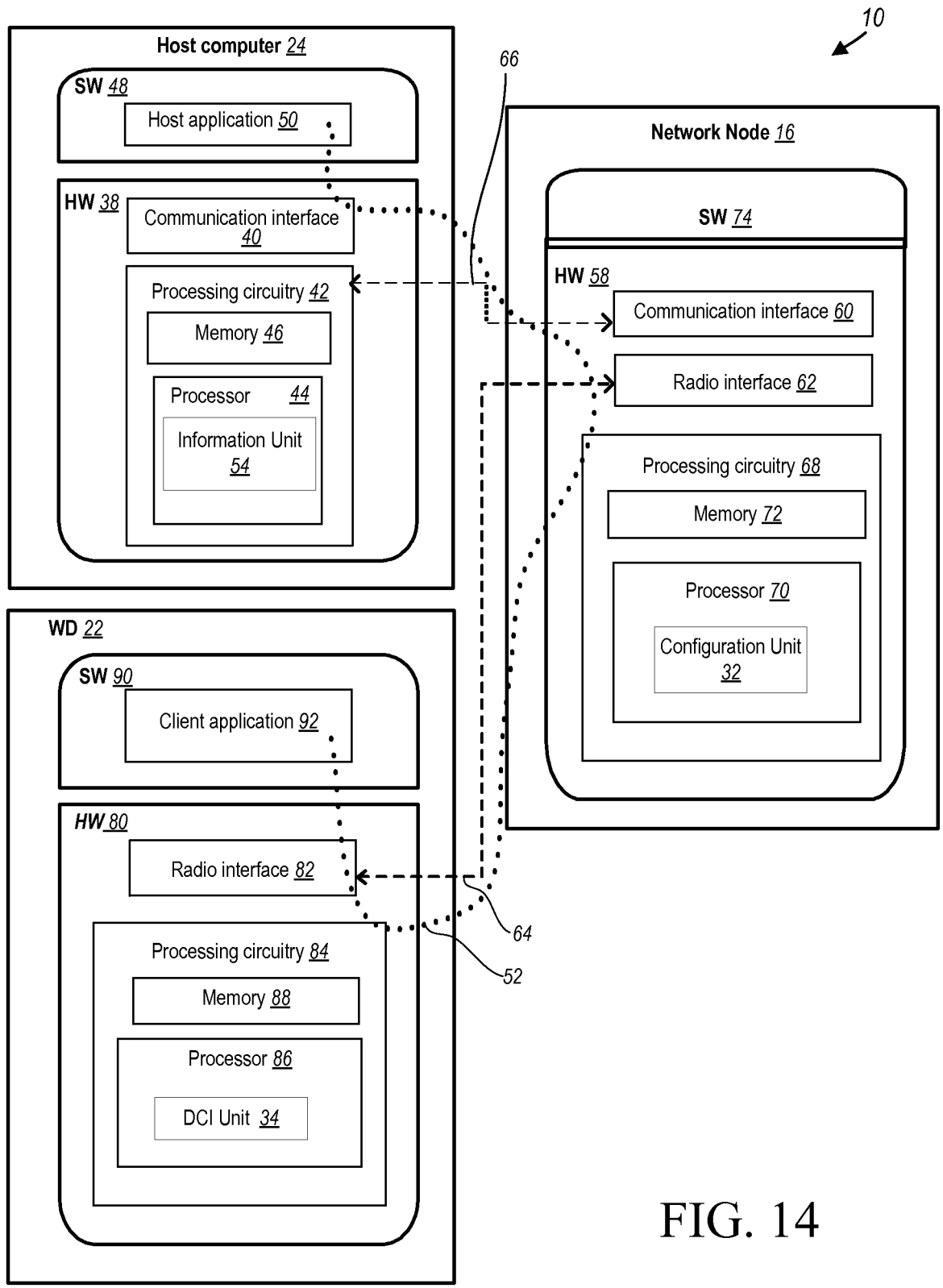
FIG. 14 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 14 and independently, the surrounding network topology may be that of FIG. 13.

In FIG. 14, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 13 and 14 show various "units" such as configuration unit 32, and DCI unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 15, 16:
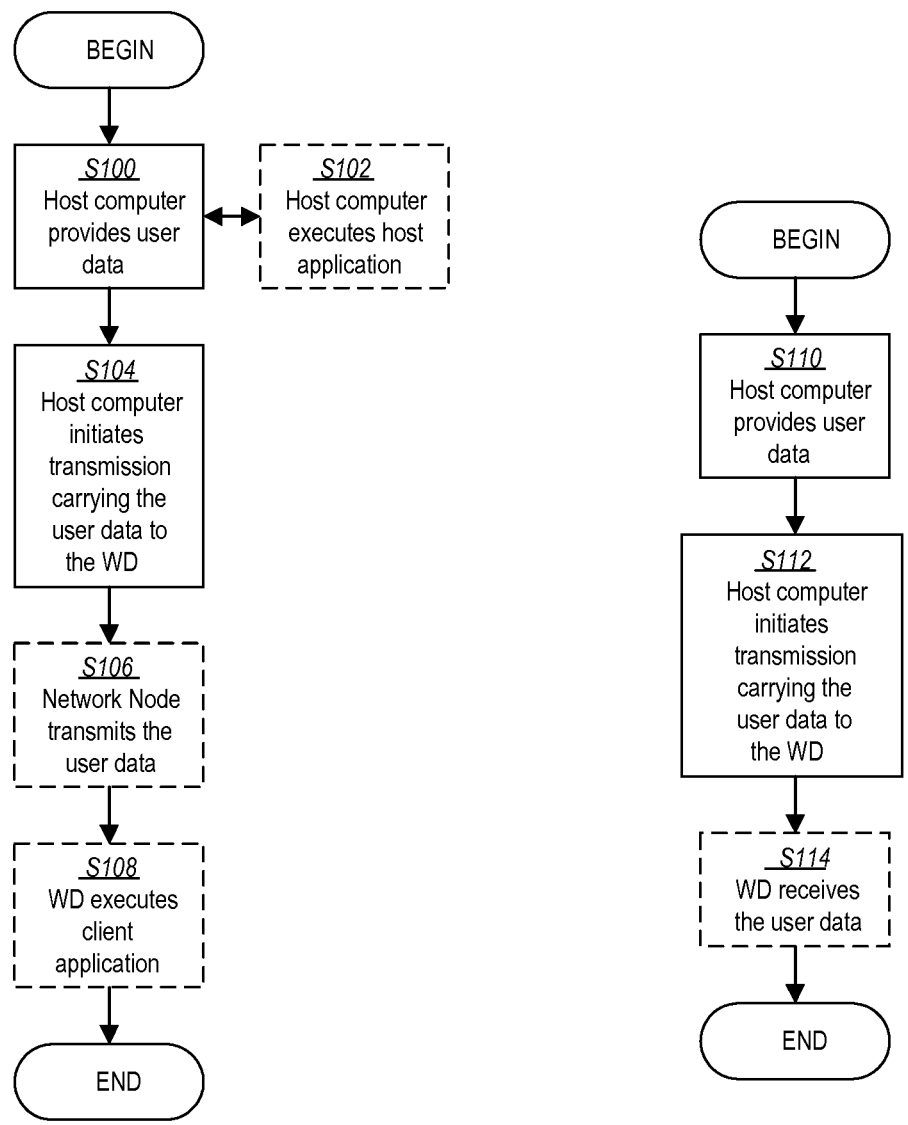
FIG. 15 is a flowchart illustrating exemplary methods implemented in a communication system including a host computer, a network node and a wireless device for executing a client application at a wireless device according to some embodiments of the present disclosure.
FIG. 16 is a flowchart illustrating exemplary methods implemented in a communication system including a host computer, a network node and a wireless device for receiving user data at a wireless device according to some embodiments of the present disclosure.

FIG. 15 is a flowchart illustrating an exemplary method implemented in a communication system, such as, for example, the communication system of FIGS. 13 and 14, in accordance with one embodiment. The communication system may include a host computer 24, a network node 16 and a WD 22, which may be those described with reference to FIG. 14. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 16 is a flowchart illustrating an exemplary method implemented in a communication system, such as, for example, the communication system of FIG. 13, in accordance with one embodiment. The communication system may include a host computer 24, a network node 16 and a WD 22, which may be those described with reference to FIGS. 13 and 14. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 17:
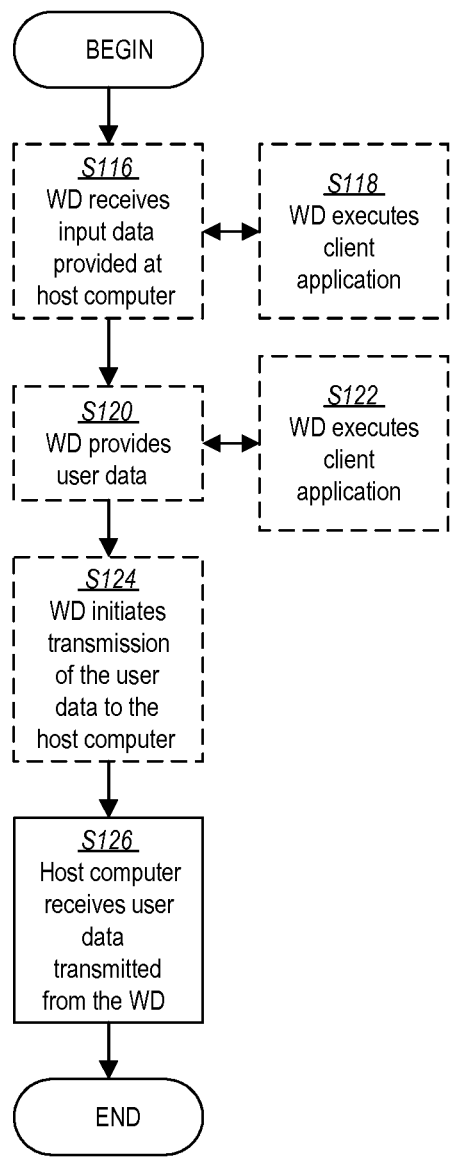
FIG. 17 is a flowchart illustrating exemplary methods implemented in a communication system including a host computer, a network node and a wireless device for receiving user data from the wireless device at a host computer according to some embodiments of the present disclosure.

FIG. 17 is a flowchart illustrating an exemplary method implemented in a communication system, such as, for example, the communication system of FIG. 13, in accordance with one embodiment. The communication system may include a host computer 24, a network node 16 and a WD 22, which may be those described with reference to FIGS. 13 and 14. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 18:
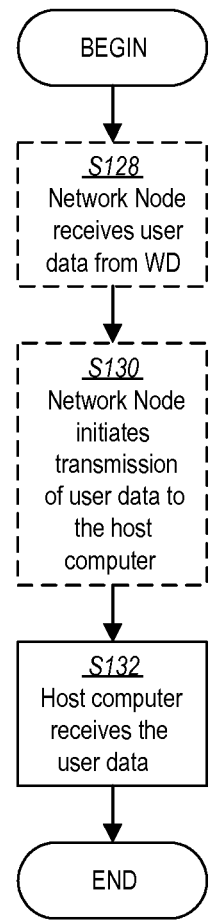
FIG. 18 is a flowchart illustrating exemplary methods implemented in a communication system including a host computer, a network node and a wireless device for receiving user data at a host computer according to some embodiments of the present disclosure.

FIG. 18 is a flowchart illustrating an exemplary method implemented in a communication system, such as, for example, the communication system of FIG. 13, in accordance with one embodiment. The communication system may include a host computer 24, a network node 16 and a WD 22, which may be those described with reference to FIGS. 13 and 14. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 19:
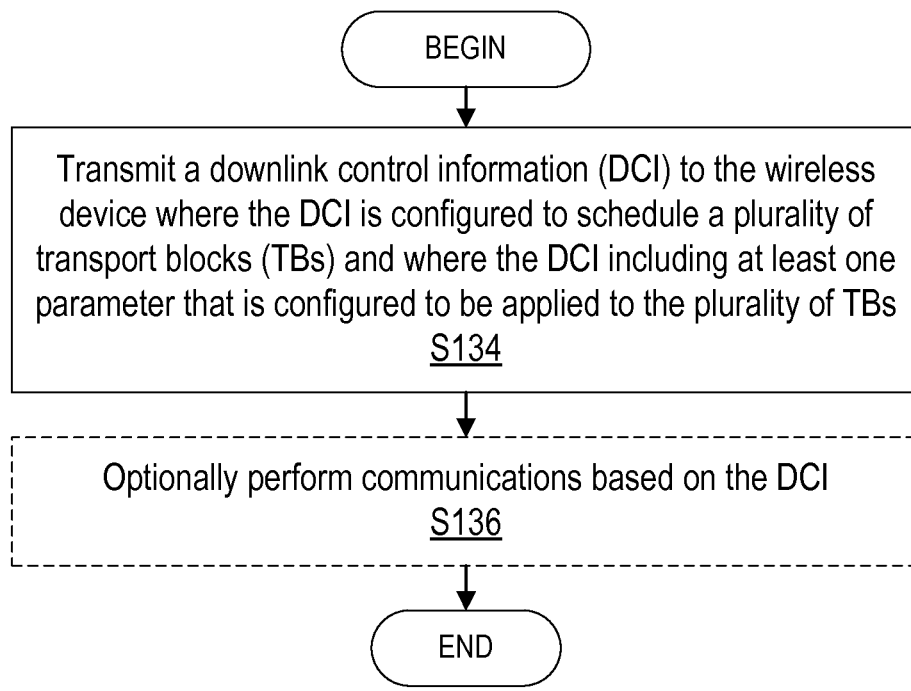
FIG. 19 is a flowchart of an exemplary process in a network node for performing communications based on a downlink control information (DCI) for scheduling multiple TBs using at least one parameter to be applied to the multiple TBs according to some embodiments of the present disclosure.

FIG. 19 is a flowchart of an exemplary process implemented by network node 16 for performing communications based on DCI for scheduling multiple TBs using at least one parameter to be applied to the multiple TB according to some embodiments of the present disclosure. One or more Blocks and/or functions performed by network node 16 may be performed by one or more elements of network node 16 such as by configuration unit 32 in processing circuitry 68, processor 70, radio interface 62, etc. In one or more embodiments, network node 16 such as via one or more of processing circuitry 68, processor 70, communication interface 60, configuration unit 32 and radio interface 62 is configured to transmit (Block S134) a downlink control information (DCI) to the wireless device 22 where the DCI is configured to schedule a plurality of transport blocks (TBs) and where the DCI includes at least one parameter that is configured to be applied to the plurality of TBs. In one or more embodiments, network node 16 such as via one or more of processing circuitry 68, processor 70, configuration unit 32, communication interface 60 and radio interface 62 is configured to perform (Block S136) communications based on the transmitted DCI.

According to one or more embodiments, each of the plurality of TBs map to respective hybrid automatic repeat request (HARQ) processes. According to one or more embodiments, the processing circuitry 68 is configured to determine whether to enable the DCI that is configured to schedule the plurality of TBs based on an amount of data in a buffer of the network node 16.

According to one or more embodiments of this aspect, each of the plurality of TBs map to a respective hybrid automatic repeat request (HARQ) process. According to one or more embodiments of this aspect, the processing circuitry 68 is further configured to determine whether to enable DCI that is configured to schedule the plurality of TBs based on an amount of data in a buffer of the network node 16. According to one or more embodiments of this aspect, the at least one parameter is configured to be applied to hybrid automatic repeat request (HARQ) processes associated with retransmissions.

According to one or more embodiments of this aspect, the plurality of TBs correspond to at least one uplink TB and at least one downlink TB. According to one or more embodiments of this aspect, the processing circuitry 68 is further configured to cause transmission of radio resource control, RRC, signaling to configure the wireless device 22 to receive the DCI in a predefined format where the DCI in the predefined format is specific to the wireless device 22. According to one or more embodiments of this aspect, the at least one parameter includes at least one of: precoding information, demodulation reference signal, DM-RS, scrambling, downlink assignment index, physical uplink control channel, PUCCH, power control, and a number of physical downlink channel repetitions. According to one or more embodiments of this aspect, the plurality of TBs corresponds to a predefined maximum quantity of TBs that can be scheduled.

Figure 20:
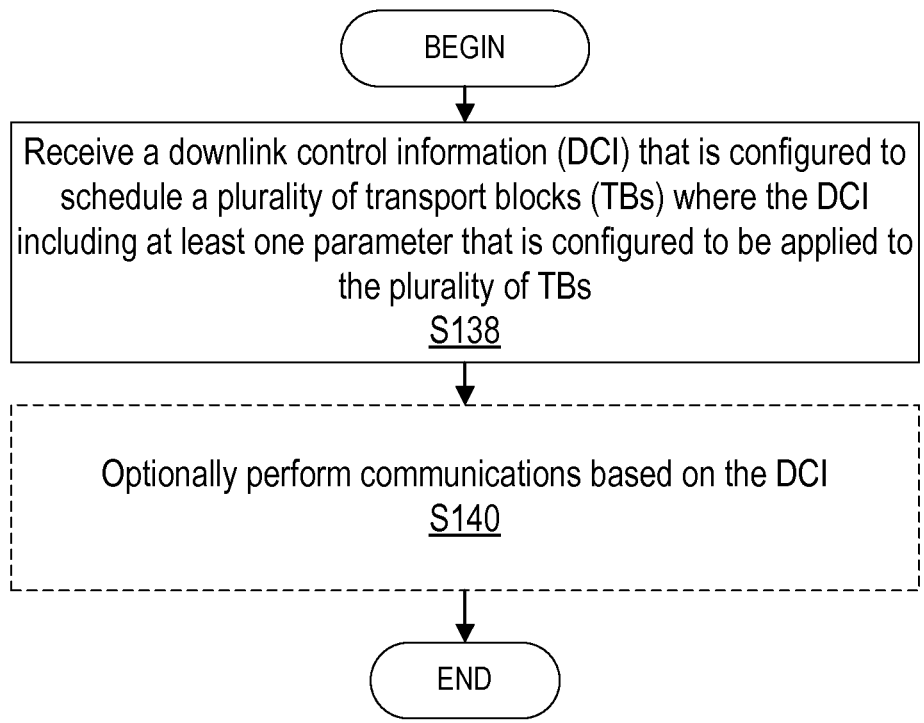
FIG. 20 is a flowchart of an exemplary process in a wireless device for performing communications based on a DCI for scheduling multiple TBs using at least one parameter to be applied to the multiple TBs according to some embodiments of the present disclosure.

FIG. 20 is a flowchart of an exemplary process implemented by a wireless device 22 for performing communications based on DCI for scheduling multiple TBs using at least one parameter to be applied to the multiple TB according to some embodiments of the present disclosure. One or more Blocks and/or functions performed by wireless device 22 may be performed by one or more elements of wireless device 22 such as by DCI unit 34 in processing circuitry 84, processor 86, radio interface 82, etc. In one or more embodiments, wireless device 22 such as via one or more of processing circuitry 84, processor 86, DCI unit 34 and radio interface 82 is configured to receive (Block S138) a downlink control information (DCI) that is configured to schedule a plurality of transport blocks (TBs) where the DCI includes at least one parameter that is configured to be applied to the plurality of TBs. In one or more embodiments, wireless device 22 such as via one or more of processing circuitry 84, DCI unit 34, processor 86 and radio interface 82 is configured to perform (Block S140) communications based on the received DCI.

According to one or more embodiments, each of the plurality of TBs map to respective hybrid automatic repeat request (HARQ) processes. According to one or more embodiments, processing circuitry 84 is configured to monitor for the DCI in one DCI format at a time.

According to one or more embodiments of this aspect, each of the plurality of TBs map to a respective hybrid automatic repeat request (HARQ) process. According to one or more embodiments of this aspect, the at least one parameter is configured to be applied to hybrid automatic repeat request (HARQ) processes associated with retransmissions. According to one or more embodiments of this aspect, the plurality of TBs correspond to at least one uplink TB and at least one downlink TB. According to one or more embodiments of this aspect, the processing circuitry 84 is further configured to receive radio resource control, RRC, signaling that configures the wireless device 22 to receive the DCI in a predefined format where the DCI in the predefined format is specific to the wireless device 22.

According to one or more embodiments of this aspect, the at least one parameter includes at least one of: precoding information, demodulation reference signal, DM-RS, scrambling, downlink assignment index, physical uplink control channel, PUCCH, power control, and a number of physical downlink channel repetitions. According to one or more embodiments of this aspect, the plurality of TBs corresponds to a predefined maximum quantity of TBs that can be scheduled.

Having generally described arrangements for providing downlink control information (DCI) for scheduling multiple TBs using at least one parameter to be applied to the multiple TB, details for these arrangements, functions and processes are provided as follows, and which may be implemented by the network node 16, wireless device 22 and/or host computer 24.

As discussed above, the gain of using one DCI to schedule multiple TBs is from the savings of wireless devices 22 monitoring DCI, especially for the wireless devices 22 that require larger amount of repetitions. For those wireless devices 22, as coverage may be important, so it may not be desirable to increase the DCI size too much, as the N/MPDCCH carrying DCI requires higher reliability, and the smaller the DCI the better. Also, it may not be desirable to increase the overhead to request the wireless device 22 to monitor more than 1 DCI format at once.

Using a single DCI to schedule multiple TBs may increase the wireless device 22 throughput in poor coverage, and the network or network node 16 may only use this function when there is enough data in the buffer. Furthermore, as there is limited channel quality feedback in NB-IoT, it may be reasonable to assume that the multiple TBs can be of the same size and using the same MCS schemes, at least for the initial transmission. It is unlikely that the network node 16 would divide the TBs unevenly and use different MCS and number of repetitions, especially for stationary wireless devices 22.

Therefore, it is described in one or more embodiments of this disclosure that a method performed by a wireless device 22 for reducing overhead signaling in a wireless communication network, the method comprising:

determining whether a downlink control information (DCI) is configured to schedule multiple transport blocks (TBs); and transmitting or receiving the TBs to and from the base station using the parameters given in the DCI, where some of the parameters are commonly applied to all the TBs scheduled by the DCI.

Common for Both LTE-M and NB-IoT

In one of the embodiments, the multiple (consecutive) TBs scheduled by a single DCI has a one-to-one mapping to the corresponding HARQ processes. That is, the first TBs corresponds to HARQ process #0, the second TBs corresponds to HARQ process #1, and so on.

In one of the embodiments, the aforementioned field in the DCI is interpreted based on one or more parameters signaled by higher layer.

In one embodiment, the enabling of using one DCI to schedule multiple TBs and the number of HARQ processes are decided by the network or network node 16 such as via one or more of processing circuitry 68, configuration unit 32, etc., based on the amount of data in the buffer (where UL is based on the wireless device 22 buffer while DL is based on the buffer at the network or network node 16 of this wireless device 22) that needs to be communicated. In one embodiment, the enabling of using one DCI to schedule multiple TBs (or HARQ processes) can be configured individually for DL and UL, respectively. In one of the embodiments, the maximum number of supported TBs or HARQ processes can be scheduled such as by network node 16 via one or more of processing circuitry 68, configuration unit 32, etc., by a single DCI is semi-statically configured via, e.g., radio resource control (RRC) signaling. In one of the embodiments, if the wireless device 22 is configured to monitor a DCI that schedules multiple TBs, the wireless device 22 such as one or more of processing circuitry 68, configuration unit 32, radio interface 62, etc., only monitors one DCI format at a given time. For example, in one or more embodiments, the RRC signaling configures the wireless device 22 to receive the DCI in a predefined format such that the wireless device 22 monitors for this predefined format at a given time. In one or more embodiments, the wireless device 22 performs decoding of a predefined/specific DCI format based at least in part on the RRC signaling and/or the wireless device 22 interprets one or more fields in the DCI differently based at least in part on the RRC signaling. The DCI in the predefined format may be specific to the wireless device 22. The DCI format can be indicated by but not limited to, e.g., scrambled by a given Radio Network Temporary Identifier (RNTI).

One item raised in 3GPP during the work with NB-IoT Rel-14 regarding the potential use of a single DCI for scheduling multiple TBs is that the DCI decoding reliability may be decreased due to the increase of DCI size. Therefore, more repetitions may be needed to compensate for the decreased reliability, i.e., increase reliability. Thus, it may be useful to try to keep the DCI size to a minimum.

One solution to minimize the DCI size is to let all parameters be obtained from the DCI of the initial transmission, i.e., HARQ processes with retransmissions may not use the values in the current DCI, but will use the parameters from the initial transmission (indicated via the New Data Indicator field) for this particular HARQ process.

A potential challenge with this is that it may fragment the spectrum since different HARQ processes may use different resource allocations, and the wireless device 22 such as via one or more of processing circuitry 68, configuration unit 32, etc., may need to re-tune, between the respective TBs/HARQ processes.

An alternative solution is to let all HARQ processes use the values from the current DCI except the TB size which is derived from the parameters of the initial transmission. This may alleviate the problem with the fragmentation and re-tuning, but may cause an issue when changing the MCS, since the TB may not "fit" the new allocation. Then there may be a mix where, e.g., the resource allocation is obtained from the current DCI.

In one of the embodiments, all parameters used for the transmission of a HARQ process are obtained such as by the wireless device 22 via, for example, one or more of radio interface 82, processing circuitry 84, DCI unit 34, etc., from the DCI used for the initial transmission of the HARQ process. In another embodiment, all parameters used for the transmission of a HARQ process are obtained such as by the wireless device 22 via, for example, one or more of radio interface 82, processing circuitry 84, DCI unit 34, etc., from the current DCI. In another embodiment, the transport block size is obtained such as by the wireless device 22 via, for example, one or more of radio interface 82, processing circuitry 84, DCI unit 34, etc., from the parameters obtained in the initial transmission and the current DCI is used for the transmission.

NB-IoT Specific

In one embodiment, a single field in the DCI is used such a by the network node 16 via, for example, one or more of radio interface 62, configuration unit 32, etc., to indicate a size of all the TBs that are scheduled by the same DCI. That is the same size of is applied to all the TBs that are scheduled by the same DCI.

In one of the embodiments, a single field in the DCI is used such a by the network node 16 via, for example, one or more of radio interface 62, configuration unit 32, etc., to indicate the number of repetitions that may be applied to all the TBs that are scheduled by the same DCI. That is the same number of repetitions is applied to all the TBs that are scheduled by the same DCI.

In one embodiment, a single field in the DCI is used such as by network node 16 via, for example, one or more of radio interface 62, configuration unit 32, etc., to indicate the modulation and coding scheme (MCS) that may be applied such as by the wireless device 22 via, for example, one or more of radio interface 82, processing circuitry 84, DCI unit 34, etc., to all the TBs that are scheduled by the same DCI. That is the same MCS is applied to all the TBs that are scheduled by the same DCI.

LTE-M Specific

In one of the embodiments, a single field in the DCI is used such as by network node 16 via, for example, one or more of radio interface 62, configuration unit 32, etc., to indicate the Redundancy version (RV) that may be applied to all the TBs that are scheduled as initial transmission by the same DCI.

In one embodiment, in the DCI for UL scheduling, the following fields, TPC command, Downlink Assignment Index, CSI request, DCI subframe repetition number, Flag for 6-0/6-1 differentiation, may be commonly interpreted for all the TBs scheduled by the same DCI.

In one embodiment, in the DCI for UL scheduling, the following fields may have a common interpretation for all the TBs scheduled by the same DCI: PMI confirmation, Precoding information, DM-RS scrambling/antenna ports, Downlink assignment index, PUCCH power control, sounding reference signal (SRS) request, Number of MPDCCH repetitions, Flag for 6-0/6-1 differentiation.

In one of the embodiments, a single field in the DCI is used such as by the network node 16 via, for example, one or more of radio interface 62, processing circuitry 68, configuration unit 32, etc. to indicate the Resource allocation that should be applied to all the TBs that are scheduled by the same DCI.

Other DL Aspects

NB-IoT

In the DL, as discussed above, if multiple TBSs are scheduled in the DL, the acknowledgement (ACK)/negative acknowledgment (NACK) of the each of the TBs may be sent individually in the UL such as by the wireless device 22 via, for example, one or more of radio interface 82, processing circuitry 84, DCI unit 34, etc. Recall that in NB-IoT frequency division duplex (FDD), an NB-IoT wireless device may not switch to UL until it finishes receiving the DL. Therefore, at least two options can be considered as to how to send the feedback in the UL such as by the wireless device 22 via, for example, one or more of radio interface 82, processing circuitry 84, DCI unit 34, etc. One option, Option 1, is to allocate non-overlapping NPUSCH format 2 resources for each of the TBs, and another option, Option 2, is to bundle the HARQ ACK/NACK feedbacks. A challenge with option 1 may be that it may require excessive UL resources, and the signalling overhead can be significant to indicate the UL resources for the feedback. For option 2, a new channel other than NPUSCH format 2 in the UL may be introduced/provided to carrier the bundled HARQ ACK/NACK feedbacks. This is because NPUSCH format 2 currently is sequence based, which may only convey 1-bit information, and cover code is applied on NPUSCH format 2 to indicate scheduling requests. More cover codes can be introduced, but the excessive possible combinations may degrade the NPUSCH format 2 performance.

In one of the embodiments, a new UL channel with BPSK/QPSK modulation to send bundled HARQ ACK/NACK feedbacks for the DL TBs such as by the wireless device 22 via, for example, one or more of radio interface 82, processing circuitry 84, DCI unit 34, etc., is provided. That is a bit sequence is modulated to indicate whether each of the DL TBs is correctly received or not.

In one of the embodiments, a scheduling request is also carried by the channel. That is a bit sequence is modulated to indicate if each of the DL TBs is correctly received or not and whether there is a scheduling request from the UE or not.

In one of the embodiments, in the DCI, the new data indictor field can indicate whether the DCI is used for initial transmission or retransmission. If the DCI is used for retransmission, a field in the DCI may further indicate which TBs (or HARQ processes) are retransmitted. Presence of the field can be controlled on that whether the DCI is used for scheduling retransmission or not.

In the UL, the HARQ ACK/NACK feedback is conveyed by the new data indicator field. Therefore, the ACK/NACK feedback is simpler comparing to the DL. Together with the new data indicator field, a field in the DCI would further indicate which TBs (or HARQ processes) are retransmitted.

LTE-M

In one of the embodiments, the HARQ ACK/NACK is bundled such as by the wireless device 22 via, for example, one or more of radio interface 82, processing circuitry 84, DCI unit 34, etc., into one single transmissions.

In another embodiment, the HARQ ACK/NACK for the respective HARQ processes uses individual HARQ ACK/NACK, in sequential subframes following the last PDSCH transmissions with the legacy timing of the HARQ ACK/NACK for the first HARQ process.

EXAMPLES

Example A1. A network node 16 configured to communicate with a wireless device 22 (WD 22), the network node 16 configured to, and/or comprising a radio interface 62 and/or comprising processing circuitry 68 configured to:

transmit a downlink control information (DCI) that is configured to schedule a plurality of transport blocks (TBs), the DCI including at least one parameter that is configured to be applied to the plurality of TBs; and perform communications based on the transmitted DCI.

Example A2. The network node 16 of Example A1, wherein each of the plurality of TBs map to respective hybrid automatic repeat request (HARQ) processes.

Example A3. The network node 16 of Example A1, wherein the network node 16 is further configured to, and/or comprising a radio interface 62 and/or comprising processing circuitry 68 further configured to determine whether to enable the DCI that is configured to schedule the plurality of TBs based on an amount of data in a buffer of the network node 16.

Example B1. A method implemented in a network node 16, the method comprising:

transmitting a downlink control information (DCI) that is configured to schedule a plurality of transport blocks (TBs), the DCI including at least one parameter that is configured to be applied to the plurality of TBs; and communications based on the transmitted DCI.

Example B2. The method of Example B1, wherein each of the plurality of TBs map to respective hybrid automatic repeat request (HARQ) processes.

Example B3. The method of Example B1, further comprising determining whether to enable the DCI that is configured to schedule the plurality of TBs based on an amount of data in a buffer of the network node 16.

Example C1. A wireless device 22 (WD 22) configured to communicate with a network node 16, the WD 22 configured to, and/or comprising a radio interface and/or processing circuitry 84 configured to:

receive a downlink control information (DCI) that is configured to schedule a plurality of transport blocks (TBs), the DCI including at least one parameter that is configured to be applied to the plurality of TBs; and perform communications based on the received DCI.

Example C2. The WD 22 of Example C1, wherein each of the plurality of TBs map to respective hybrid automatic repeat request (HARQ) processes.

Example C3. The WD 22 of Example C1, wherein the WD 22 is further configured to, and/or comprising a radio interface 82 and/or processing circuitry 84 further configured to monitor for the DCI in one DCI format at a time.

Example D1. A method implemented in a wireless device 22 (WD 22), the method comprising:

receiving a downlink control information (DCI) that is configured to schedule a plurality of transport blocks (TBs), the DCI including at least one parameter that is configured to be applied to the plurality of TBs; and performing communications based on the received DCI.

Example D2. The method of Example D1, wherein each of the plurality of TBs map to respective hybrid automatic repeat request (HARQ) processes.

Example D3. The method of Example D1, further comprising monitoring for the DCI in one DCI format at a time.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

| Abbreviations that may be used in the preceding description include | |
| --- | --- |
| BL UE | Bandwidth-reduced Low-complexity UE |
| CE UE | Coverage Enhancement UE |
| CEModeA | Coverage Enhancement Mode A |
| CEModeB | Coverage Enhancement Mode B |
| CRS | Cell-specific Reference Signal |
| C-RNTI | Cell RNTI |
| CSI | Channel State Information |
| DCI | Downlink Control Information |
| EDT | Early Data Transmission |
| eMTC | Enhanced MTC (a.k.a. LTE-M or LTE-MTC) |
| eNB | Evolved NodeB |
| LTE | Long Term Evolution |
| LTE-M | LTE for MTC |
| LTE-MTC | LTE for MTC |
| MPDCCH | MTC Physical Downlink Control Channel |
| MTC | Machine-Type Communications |
| NB-IOT | Narrowband Internet of Things |
| NPDCCH | Narrowband Physical Downlink Control Channel |
| NPDSCH | Narrowband Physical Downlink Shared Channel |
| NPUSCH | Narrowband Physical Uplink Shared Channel |
| NRS | Narrowband reference signal |
| NW | Network |
| NWUS | Narrowband Wake-up signal |
| PDSCH | Physical Downlink Shared Channel |
| PRACH | Physical Random Access Channel |
| PUCCH | Physical Uplink Control Channel |
| PUSCH | Physical Uplink Shared Channel |
| PRB | Physical Resource Block |
| RAR | Random Access Response |
| RNTI | Radio Network Temporary Identifier |
| SI | System Information |
| SNR | Signal to Noise Ratio |
| SINR | Signal to Interference and Noise Ratio |
| TBS | Transport Block Size |
| UE | User Equipment |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings. As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising processing circuitry configured to:
   transmit a downlink control information (DCI) to the wireless device, the DCI configured to schedule a plurality of transport blocks (TBs), the DCI including at least one parameter that is configured to be applied to the plurality of TBs, the at least one parameter including:
   a number of subframe repetitions corresponding to each TB scheduled for transmission on a physical downlink channel; and
   perform communications based on the DCI.

2. The network node of claim 1, wherein each of the plurality of TBs map to a respective hybrid automatic repeat request (HARQ) process.

3. The network node of claim 1, wherein the processing circuitry is further configured to determine whether to enable DCI that is configured to schedule the plurality of TBs based on an amount of data in a buffer of the network node.

4. The network node of claim 1, wherein the at least one parameter is configured to be applied to a hybrid automatic repeat request (HARQ) processes associated with retransmissions.

5. The network node of claim 1, wherein the at least one parameter further includes at least one of:
   precoding information;
   downlink assignment index; and
   physical uplink control channel (PUCCH) power control.

6. The network node of claim 1, wherein the at least one parameter further includes:
   demodulation reference signal (DM-RS) scrambling.

7. A wireless device configured to communicate with a network node, the wireless device comprising processing circuitry configured to:
   receive a downlink control information (DCI) that is configured to schedule a plurality of transport blocks (TBs), the DCI including at least one parameter that is configured to be applied to the plurality of TBs, the at least one parameter including:
   a number of subframe repetitions corresponding to each TB scheduled for transmission on a physical downlink channel; and
   perform communications based on the DCI.

8. The wireless device of claim 7, wherein each of the plurality of TBs map to a respective hybrid automatic repeat request (HARQ) process.

9. The wireless device of claim 7, wherein the at least one parameter is configured to be applied to a hybrid automatic repeat request (HARQ) processes associated with retransmissions.

10. The wireless device of claim 7, wherein the processing circuitry is configured to receive radio resource control (RRC) signaling that configures the wireless device to receive the DCI in a predefined format; and
the DCI in the predefined format being specific to the wireless device.

11. The wireless device of claim 7, wherein the at least one parameter further includes at least one of:
precoding information;
downlink assignment index; and
physical uplink control channel (PUCCH) power control.

12. The wireless device of claim 7, wherein the at least one parameter further includes:
demodulation reference signal (DM-RS) scrambling.

13. A method for a network node configured to communicate with a wireless device, the method comprising:
transmitting a downlink control information to the wireless device, the DCI being configured to schedule a plurality of transport blocks (TBs), the DCI including at least one parameter that is configured to be applied to the plurality of TBs, the at least one parameter including:
a number of subframe repetitions corresponding to each TB scheduled for transmission on a physical downlink channel; and
performing communications based on the DCI.

14. The method of claim 13, wherein each of the plurality of TBs map to a respective hybrid automatic repeat request (HARQ) process.

15. The method of claim 13, further comprising determining whether to enable DCI that is configured to schedule the plurality of TBs based on an amount of data in a buffer of the network node.

16. The method of claim 13, wherein the at least one parameter is configured to be applied to a hybrid automatic repeat request (HARQ) processes associated with retransmissions.

17. The method of claim 13, wherein the plurality of TBs correspond to at least one uplink TB and at least one downlink TB.

18. The method of claim 13, further comprising causing transmission of radio resource control (RRC) signaling to configure the wireless device to receive the DCI in a predefined format; and
the DCI in the predefined format being specific to the wireless device.

19. The method of claim 13, wherein the at least one parameter further includes at least one of:
precoding information;
downlink assignment index; and
physical uplink control channel (PUCCH) power control.

20. The method of claim 13, wherein the plurality of TBs corresponds to a predefined maximum quantity of TBs that can be scheduled.

21. The method of claim 13, wherein the at least one parameter further includes:
demodulation reference signal (DM-RS) scrambling.

22. A method implemented in a wireless device configured to communicate with a network node, the method comprising:
receiving a downlink control information (DCI) that is configured to schedule a plurality of transport blocks (TBs), the DCI including at least one parameter that is configured to be applied to the plurality of TBs, the at least one parameter including:
a number of subframe repetitions corresponding to each TB scheduled for transmission on a physical downlink channel; and
performing communications based on the DCI.

23. The method of claim 22, wherein each of the plurality of TBs map to a respective hybrid automatic repeat request (HARQ) process.

24. The method of claim 22, wherein the at least one parameter is configured to be applied to a hybrid automatic repeat request (HARQ) processes associated with retransmissions.

25. The method of claim 22, wherein the plurality of TBs correspond to at least one uplink TB and at least one downlink TB.

26. The method of claim 22, further comprising receiving radio resource control (RRC) signaling that configures the wireless device to receive the DCI in a predefined format; and
the DCI in the predefined format being specific to the wireless device.

27. The method of claim 22, wherein the at least one parameter further includes at least one of:
precoding information;
downlink assignment index; and
physical uplink control channel (PUCCH) power control.

28. The method of claim 22, wherein the plurality of TBs corresponds to a predefined maximum quantity of TBs that can be scheduled.

29. The method of claim 22, wherein the at least one parameter further includes:
demodulation reference signal (DM-RS) scrambling.

* * * * *